Patented Sept. 29, 1931

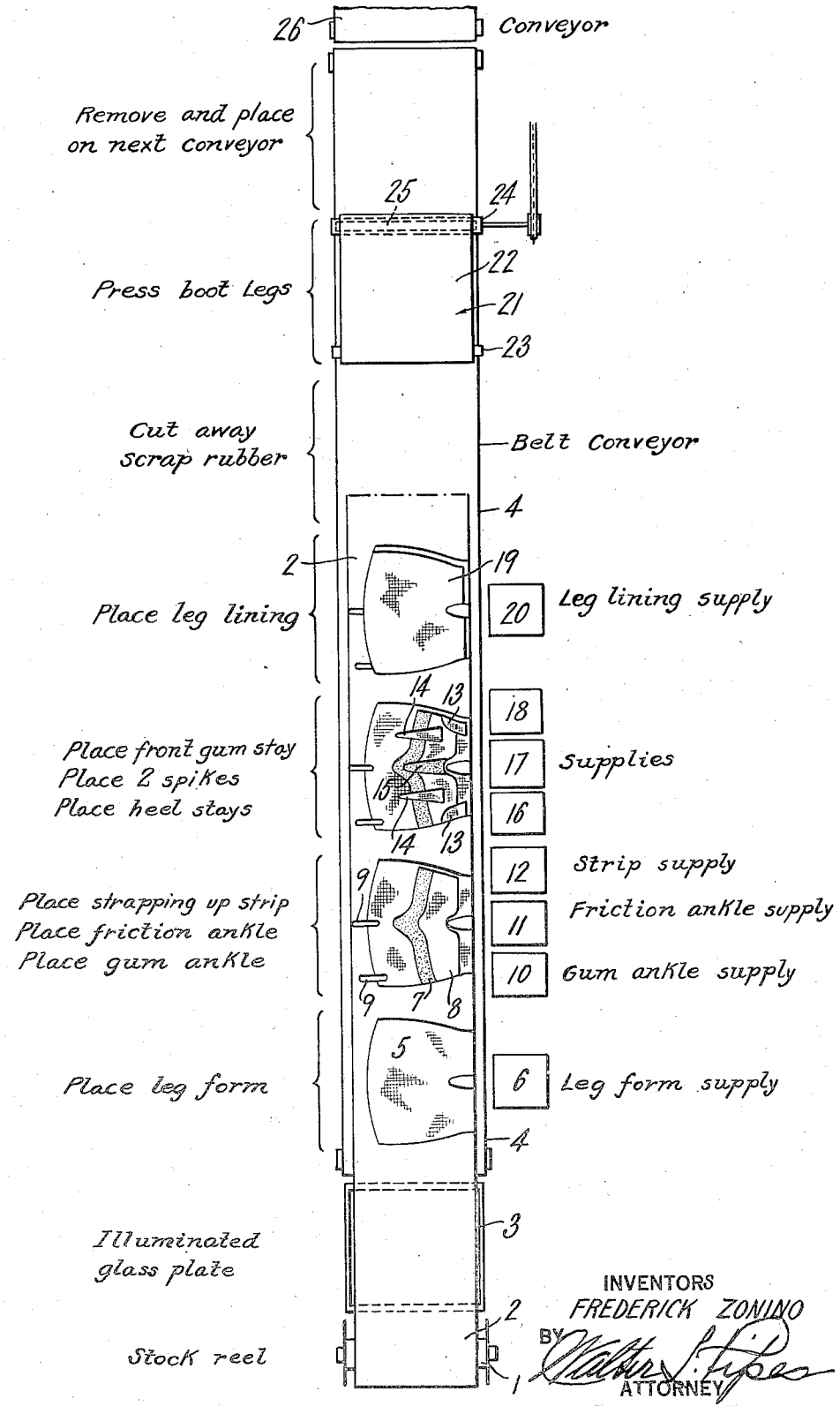

1,825,379

UNITED STATES PATENT OFFICE

FREDERICK ZONINO, OF NAUGATUCK, CONNECTICUT, ASSIGNOR TO THE GOODYEAR'S INDIA RUBBER GLOVE MFG. COMPANY, OF NAUGATUCK, CONNECTICUT, A CORPORATION OF CONNECTICUT

METHOD OF ASSEMBLING RUBBER FOOTWEAR ELEMENTS

Application filed March 7, 1931. Serial No. 520,960.

This invention relates to a method of assembling rubber footwear elements, more particularly to the assembling of elements which may be superposed while in a substantially flat condition.

In the making of various forms of rubber footwear such as boots, gaiters, gum shoes, etc., the practice for many years was for an individual operator to build up a complete article on a last by superposing and fitting in proper order the parts going to make up the article, obtaining his parts as necessary from bulk supplies of the individual parts disposed within convenient reach. In recent years a practice has grown up to some extent of assembling certain parts of footwear articles in the flat and off the last and then applying them in united form to the last and finishing the building of the article. Thus gum shoe uppers and arctic uppers have been so built up in the flat, then lasted over on to an insole and the footwear article finished by applying the remaining parts on the last.

The majority of the parts going to make up the usual lines of rubber footwear are formed from calendered sheet rubber, various kinds of fabric which may be rubberized on either one or both sides, and filling and reinforcing parts made up entirely or mainly from a material known as rag stock which is composed simply of ground up waste rubberized fabric and rubber calendered into sheet form. In the building up of rubber articles from sheet stocks, it is desirable in order to secure proper adhesion during the building up process, without too frequent use of cement, that the rubber be in a rather tacky and sticky condition. It is also necessary in order to calender rubber that it be in a heated and plastic condition and when in such plastic condition it has practically no strength and is very easily distorted, particularly when calendered out into the relatively thin sheets which are used for making some of the lighter forms of rubber footwear. In supplying cut out parts from the sheets to the maker, the parts are sometimes manually cut out or singly died out, but as before pointed out, the rubber of the stock is in a very sticky and tacky condition and if it is composed of rubber only, it is also lacking in strength. Therefore, in storing and transporting the cut out parts before use, the usual method has been to place them in what are known as "books", the pages of which are formed of fabric.

Instead of individually cutting or dieing out parts, they are sometimes formed in multiple ply by plying up sheets of rubber or rubberized fabric with interposed sheets of oiled or waxed paper, the plied up assembly being placed in a machine known as a "cliker", and in this machine the operator moves a die around to a selected position and then operates the machine to force the die through the plied up sheets, after which the die is moved to another spot and again operated. This method of forming multiple ply cut out parts is objectionable, because the operator in hurriedly moving around the die does not always avail himself of the total area to cut out the greatest possible number of the parts, and due to the heavy pressure of the die, the edges of the cut out parts and the interposed paper are rather strongly adhered, so that when the maker desires to strip a part or an interposed sheet of paper from the multiple ply assembly, he sometimes has difficulty in removing them. Moreover, the paper used in this method of cutting out parts is, of course, completely wasted. Irrespective of whether the parts have been individually cut out and booked, or cut out in multiple ply, the maker in taking up the parts to assemble them in an article must exercise care in order to avoid distorting the rubber or overlapping and adhering portions of it.

Particular difficulty is had in handling some of the larger parts which are composed entirely of sheet rubber, for instance, the outers of boot legs, the outers of hip boot tops, or the upper outers of rubber gaiters or gum shoes. As before pointed out, the stock of which these parts are composed is plastic and without any strength and in an extremely tacky condition, therefore, after the parts are cut out, care must be exercised in handling them while placing them between the fabric leaves of a book, and to prevent pressure on the leaves. If one part of a rubber outer overlaps on to another part of it or on to another outer, the parts immediately adhere and it is difficult to separate them, in fact, if they have been united under any pressure, they can no longer be separated but must be thrown out as scrap. An additional difficulty with "booked" parts composed of sheet rubber alone, is that calendered sheet rubber tends to shrink after calendering and if the parts are cut out before this shrinkage has taken place, they will not only shrink in the books but will also distort since the soft fabric of the book leaves has not sufficient rigidity to prevent such distortion. Hence, it has been necessary in cutting out the larger rubber outer parts, such as gaiter and gum shoe upper outers, and boot leg outers, to reel up the calendered stock with an interposed fabric liner and allow it to cool and shrink before cutting out the parts. However, if freshly calendered sheet rubber stock can be immediately or shortly after calendering adhered firmly to material of sufficient stiffness, such as an assembled upper, it then cannot shrink or distort.

When the booked rubber outers for various articles are received by the maker, he must then open up the pages and strip the rubber part from the page when he is ready to apply the part to a footwear article being built up on a last, or to a footwear assembly being built up in the flat. He must exercise the same care in removing the part from the book that the previous operator used in placing it in the book, and in addition, while the adhesion is not great, there is some adhesion to the fabric of the book and he must therefore be careful in stripping the sheet rubber part from the fabric page to avoid distorting it. Similar care must be exercised in stripping such a part from a died out multiple ply assembly of parts and paper.

Still another objection to the previous method of cutting out and booking or otherwise storing sheet rubber parts before assembling them in the articles is that the number of parts cut out cannot always be accurately gauged to the exact number of completed footwear articles to be made in a ticket, and if the number of parts cut out has been too great, they may have to stand around for a greater or less length of time before another ticket is made up using the same parts. In this interval of time, the cut out sheet rubber parts lose to a considerable extent their tackiness, and in fact, if the delay has been more than a day or two, their tackiness has been lost to such an extent that they have become worthless, since they will not properly adhere when building up an article. While in the case of rubberized fabric outers the objection of distortion during handling is not present, there still is present the difficulties due to the tackiness of the rubberized surfaces.

An object of the present invention is to reduce the time, space, material, equipment and labor required in building up rubber and fabric footwear articles. Another object is to avoid difficulties due to shrinkage and distortion of calendered sheet rubber footwear parts. Another object is to assemble large rubber outer parts of footwear articles directly from the calendered sheet stock into the assembly. Still another object is to avoid the time and space losses occasioned by the booking of large outer sheet parts of rubber footwear articles.

The invention broadly comprises disposing a sheet composed of rubber at least on its upper side in an extended form, and directly assembling footwear elements in spaced superposed adhesive relation upon the sheet, removing waste or scrap portions of the sheet and uniting the superposed parts by pressure. It further comprises moving the sheet past a series of stations, at each of which parts are assembled on the sheet or operations performed on previously assembled parts.

In the figure of the drawing there is shown diagrammatically an apparatus for carrying out a specific embodiment of the method.

The method is applicable, as before stated, wherever it is desired to make up a footwear assembly in the flat or substantially in the flat, and in which an outer of rubber or rubberized fabric is employed, such as in the making of boot legs, gum shoe uppers, gaiter uppers, etc., and in the accompanying description, the invention will be set forth as specifically applied to the building up of a boot leg.

The method will be described concurrently with the apparatus for carrying it out, and in the drawing the numeral 1 represents a stock reel from which is withdrawn a sheet of rubber stock 2, portions of which are to form the rubber outer of the boot leg, the sheet passing over the glass plate 3 which may be strongly illuminated from below. The purpose in passing the sheet over this glass plate is to permit ready inspection to locate defects in the sheet. In the case of a relatively thick rubber sheet, such as a boot outer, inspection by transmitted light is ordinarily unnecessary, as defects serious enough to cause rejection may be seen by direct illumination, but such transmitted light is very desirable in the manufacture of gaiters or light gum shoes, the outers of which in some cases may be formed of very thin and deeply engraved rubber stock so that defects are more liable to appear in the stock and more difficult to detect. The sheet of stock then passes on to an ordinary belt conveyor 4 until it comes opposite the first maker's station. At this station an operator disposes leg forms 5 in spaced relation on the rubber sheet 2 as it passes him. The leg form is made of fabric rubberized on both sides, and as shown has substantially the shape of a boot leg when cut open at the rear and laid flat. The leg forms may be supplied to the operator in any suitable manner, and in the present instance a supply 6 of them is diagrammatically indicated adjacent the operator's station. The sheet 2 with the superposed leg forms then passes to the next station at which a gum ankle 7, friction ankle 8 and strapping up strips 9 are assembled by the operator as the sheet passes him. The gum ankle 7, as its name indicates, is an ankle reinforcement of gum only, which is superposed on the lower or ankle portion of the boot leg form, and over it is placed the friction ankle 8 composed of fabric rubberized on both sides, this latter part being of somewhat less height than the gum ankle. The strapping up strip is merely a small strip of rubberized fabric, one end of which is assembled into the upper parts of the boot leg while its other end projects above the top of the boot leg. The sole purpose of this projecting strip is to form an anchoring piece which is later secured to the upper end of the boot tree or last in order to hold the boot leg properly extended during manufacture, and after the boot is finished, the projecting portion of the strip is cut off flush with the top of the boot leg. The above parts may be supplied in any suitable manner, and gum ankle friction ankle and strapping up strip supplies are diagrammatically indicated at 10, 11 and 12.

The rubber sheet 2 with the previously assembled parts then moves on the conveyor 4 to the next station, at which there are assembled two heel stays 13, two spikes 14 and a front gum stay 15. The heel stays are small, elongated approximately triangular pieces which may be of rubberized fabric rubberized on both sides, and they are assembled adjacent the lower right and left corners of the boot leg form, so that when the side edges of the boot leg are brought together at the back, the stays will reinforce the heel portion. The spikes may also be formed of fabric rubberized on both sides; each is of an elongated triangular form, and they are placed on the leg form in such a position that in the finished boot leg they are on each side of the boot leg with their apices extending upwardly on the leg. The front gum stay is a narrow strip of rubber extending up the center of the ankle portion and part way up the leg. Each of the above described parts may be supplied as convenient, and respective supplies have been diagrammatically indicated in the present instance at 16, 17 and 18.

In the further movement of the boot leg assemblies on the conveyor 4, they next pass the station or point at which the leg lining 19 is assembled. The leg lining is a piece of fabric which is to form the inner lining of the boot leg and it is rubberized on one side. This part is supplied as desired and a supply is indicated at 20. The leg lining is of substantially the same shape as the leg form, and is superposed on the previously assembled parts with its fabric side uppermost. It will be noted from the drawing that the superposed parts do not extend all the way to the right hand edge of the leg form, or to its bottom edge. This is done to avoid too heavy a lap seam at the back of the closed boot leg, and to avoid a bulge on the bottom when the lower edge of the boot leg is lasted over on the insole.

At the next point or station an operator is placed to cut away the waste or scrap portions of the rubber sheet 2 surrounding each boot leg assembly. While it is possible to cut away such waste portions by the use of an ordinary knife, it may be pointed out that rubber is difficult to cut with an ordinary knife unless the knife is very sharp and unless its edge is lubricated with water. Therefore, since the assemblies are moving and the cutting must be rapidly performed, it is preferred to use a relatively dull edged knife, the blade of which is electrically heated, so that as the heated blade is passed around the boot leg assembly, it melts its way substantially through the rubber, and the waste rubber can readily be torn away. This method also avoids injury to the conveyor belt 4 such as would be caused by continued use of a sharp knife. It further avoids cutting through the fabric parts in case the knife of the operator slips in on them. If desired, this operation can be performed immediately after placing the leg form on the rubber sheet 2 and before assembling the other parts.

The complete boot leg assembly then passes to the presser 21 which irons out any irregularities, removes air blisters and completely adhesively unites all the parts.

It is possible to perform this pressing operation by cooperating rollers above and below the conveyor belt 4, but it has been found that when such rollers are used there is a tendency for the materials in the boot leg assemblage to creep or pile up in advance of the roller so that best results are not obtained. Therefore, it is preferred to use an apparatus similar to that shown, in which a short endless belt 22 runs around rollers 23 and 24. The driven roller 24 is resiliently mounted and pressed downwardly against the conveyor 4, and preferably cooperates with a roller 25 below belt 4, while the roller 23 is stationarily mounted and is spaced slightly above the conveyor 4. The effect of this arrangement is to dispose the lower run of the belt 22 and the portion of belt 4 below it in a long narrow V, the apex of which is at the point where the roller 24 presses the belt 22 against the belt 4, while its open end is adjacent the roller 23. By this arrangement the boot leg assembly is not subjected to a direct rolling treatment but is instead given a substantially direct pressing between the belts 22 and 4 which increases gradually as the assembled footwear parts pass from the roller 23 to the roller 24.

After completion of the pressing operation, the boot leg assemblies are then removed by an operator and may be placed upon a conveyor 26 to be carried to the next building operation, or otherwise disposed of.

In the same way, a hip boot top, the upper of a gum shoe or of a rubber-outer gaiter may be built up in the flat, and after finishing lasted over upon an insole on a last and the articles finished.

While the invention is particularly applicable, as before stated, to the manufacture of parts requiring a large rubber outer part, it may also be applied in the making of smaller parts or parts having cloth outers. While, of course, in the case of rubberized fabric parts there is no liability to distortion due to weakness, at the same time such parts are necessarily rubberized on their inner surface in order that the remaining elements may be adhesively united to them, and therefore by the present invention the difficulty with the adhesion of parts in books, etc. may be obviated.

It will be seen that by the present invention one of the main difficulties in the cutting out, handling and assembling of relatively thin, plastic and tacky sheet rubber footwear parts is completely obviated, particularly in the case of relatively large parts. In addition, the present invention does away with a large number of the fabric leaf books previously used for storing the parts, it avoids the labor involved in booking the cut out parts and removing them from the books, it avoids the necessity of cooling and shrinking the calendered sheet rubber stock before cutting out the parts, since by the present invention, the calendered sheet may be immediately built up into a relatively stiff assembly which will prevent it from distorting or shrinking. A large amount of space required for booking, and the use of trucks for hauling the books is also obviated.

While a specific embodiment of the invention has been disclosed, it is obvious that it is capable of wide application, and it is not desired to limit it other than as required by the prior art and as set forth in the appended claims.

Having thus described my invention, what I claim and desire to protect by Letters Patent is:

1. Method of assembling parts to form footwear elements, which comprises feeding in sheeted form material composed of rubber at least on its upper side, superposing on said material at intervals series of parts to form spaced footwear-element assemblies, removing waste portions of said material, adhesively uniting the parts of each assembly, and removing the assembled elements.

2. Method of assembling parts in the flat to form footwear elements, which comprises feeding sheeted rubber, superposing on said rubber at intervals series of rubber-containing parts to form spaced footwear-element assemblies, cutting away said rubber around the periphery of each assembly, uniting the parts of each assembly by pressure, and removing the assembled elements.

3. Method of assembling parts in the flat to form footwear elements, which comprises continuously feeding a sheet composed of rubber at least on its upper side, superposing on said sheet during its travel series of parts to form spaced footwear-element assemblies, cutting away said sheet around the periphery of each assembly, uniting the parts of each assembly by graduated pressure from one side to the other of the assembly, and removing the assembled elements.

4. Method of assembling parts to form footwear elements, which comprises feeding a sheet of rubber, successively superposing on said sheet at intervals series of rubber-containing parts to form spaced footwear-element assemblies, the parts in any one series being the same but differing from those in another series, removing waste portions of said sheet around each assembly subsequent to placing the initial part thereon, adhesively uniting the parts of each assembly, and continuously removing assemblies as they are completed.

5. Method of assembling parts to form footwear elements, which comprises unreeling a thin sheet of rubber, passing the sheet over a light source whereby flaws may be detected during its travel, superposing on the perfect portions of said sheet rubber-containing parts to form spaced footwear-element assemblies, severing the sheet around the periphery of each assembly, uniting the parts of each assembly by pressure, and continuously removing the assembled elements.

6. Method of assembling parts to form footwear elements, which comprises feeding a sheet of rubber, during its travel superposing rubberized fabric boot leg forms on said sheet at intervals, superposing on said boot leg forms additional boot upper parts, removing superfluous portions of said sheet, pressing to unite the parts into unclosed boot upper assemblies, and removing said assemblies.

7. Method of assembling parts in the flat to form footwear elements, which comprises feeding a sheet of rubber, during its travel superposing rubberized fabric boot leg forms on said sheet at intervals, superposing on said boot leg forms boot leg reinforcements and linings, severing superfluous portions of said sheet by heat and pressure, pressing to unite the parts into flat unclosed boot leg assemblies, and removing said assemblies.

8. Method of assembling parts to form boot legs in the flat, which comprises unreeling a sheet of rubber, superposing rubberized fabric leg forms at intervals on said sheet, superposing on said leg forms rubber and cloth ankles, ankle stays, side spikes and heel stays, superposing on said parts boot leg linings, severing said rubber sheet around each assembled boot leg, pressing together the parts of each assembled boot leg, and removing said boot legs.

9. A method of assembling parts to form footwear elements which comprises conducting sheeted vulcanizable rubber composition in a predetermined path, successively superposing parts to form footwear-element assemblies on said sheeted vulcanizable rubber composition, cutting the latter around the periphery of each assembly, uniting the parts to the sheeted vulcanizable rubber composition on which they have been previously superposed, and removing each united assembly.

Signed at Naugatuck, county of New Haven, State of Connecticut, this 27th day of February, 1931.

FREDERICK ZONINO.